United States Patent [19]
Denbnovetsky et al.

[11] 3,753,111
[45] Aug. 14, 1973

[54] METHOD FOR MEASURING TIME INTERVALS AND APPARATUS

[76] Inventors: Stanislav Vladimirovich Denbnovetsky, Brest-Litovsky Prospekt 35, kv. 17; Alexandr Karpovich Kovtun, ulitsa Patrisa Lumumby 13, kv. 57; Vitaly Petrovich Sigorsky, ulitsa Patrisa Lumumby 13, kv. 62, all of Kiev, U.S.S.R.

[22] Filed: July 9, 1971

[21] Appl. No.: 161,099

[52] U.S. Cl. ............................................. 324/187
[51] Int. Cl. ............................................. G04f 9/00
[58] Field of Search ..................................... 324/187

[56] References Cited
UNITED STATES PATENTS
3,325,750   6/1967   O'Hern et al. ............... 324/187 UX Primary Examiner—Alfred E. Smith
Attorney—Eric H. Waters et al.

[57] ABSTRACT

A method for measuring time intervals, by which the time interval of interest is coarsely measured by comparing it with a reference scale formed from a serves of precisely timed pulses, a fine measurement is then made of its parts contained between the pulses bounding the measured interval and the timed pulses, after which the coarse count is altered according to fine count, the fine count, the fine measurement being taken of the parts of the time interval contained between the pulses bounding it and those timed pulses the time interval between which is a multiple of the number of timed pulses at least equal to the number of possible different coarse counts of the same time interval.

A method for measuring time intervals, by which the time interval of interest is coarsely measured by comparing it with a reference scale formed from a series of precisely timed pulses, and a fine measurement is made of its parts contained between the pulses bounding the measured interval and the timed pulses, after which the coarse count is altered according to the fine count, the fine count being changed by as many units of coarse measurement as will correspond to the change of the time interval between the timed pulses to which fine measurement is made of the carry from the previous measurement, as it is completed to a multiple of the number of timed pulses at least equal to the number of possible different coarse counts of the same time interval, and this adjusted fine count is taken as that fine count which is used as a basis for the adjustment of the coarse count.

A device to realize the former method, comprising a time converter one output of which is connected to the input of a coarse-count readout means and the other output to the input of a fine-count readout means, characterized in that it comprises a coarse-count correcting means the inputs of which are connected to the outputs of the coarse- and fine-count readout means, respectively, and the output is connected to the input of the coarse-count readout means, while an apparatus realize the latter method additionally contains at least one fine-count correcting means whose input is connected to the output of the time converter and whose output to the input of the fine-count readout means.

12 Claims, 7 Drawing Figures

METHOD FOR MEASURING TIME INTERVALS AND APPARATUS

The invention relates to instrumentation, and more specifically to methods for measuring time intervals and to apparatus for their realization.

The invention may be used in measuring time intervals, for example in radio and optical location, experimental physics, etc. Its field of application may be considerably extended because the measurement of many physical and engineering quantities (frequency, phase shift between oscillations, velocity, distance, etc.) may be reduced to measuring time intervals.

Known in the art is a method for measuring time intervals by which a time interval is measured roughly (in units) by comparing it with a reference scale which is formed by a series of precisely timed pulses, and its portions occurring between the pulses bounding the measured interval and timed pulses are measured finely (in fractions), after which the rough or unit count is altered according to the fraction count. The pulse marking the beginning of the measured time interval is hereinafter designated as the start pulse, and the pulse marking its end, as the stop pulse. When rough measurement uses a consecutive count of timed pulses, the probability that an error will occur during a unit of coarse or rough measurement is non-zero because of the finite duration of the timed pulses and the finite rise and fall times of the pulse gating them to the unit counter. Therefore, a part of the time interval is measured. Beyond the start pulse and before the stop pulse, the nearest timed pulses are selected so as to be used as those bounding the part of the time interval. The selected timed pulses are also used in fine measurement when measuring other parts of the time interval bounded between the start pulse and the following selected timed pulse, and also between the selected timed pulse preceding the stop pulse and the stop pulse. Adding together the unit and fraction counts yields the total read out time interval (U.K. Pat. No. 990,564, Class 4H; U.S. Pat. No. 3,296,525, Class 324-68; Rev. Sci. Instr., 39, No. 9, pp. 1,342-1,345, 1968).

Also known in the art is an apparatus for effecting the above mentioned method for measuring time intervals. These devices comprise a circuit converting the measured time interval into pulses consisting of a coarse and a fine converter which transform its portions into pulses and whose outputs are respectively connected to a unit and a fraction counter. At the same time, the input of the coarse converter is connected to the output of the fine converter. The coarse and fine converters give indeterminate equivalents. Parts of the measured time interval are selected according to the above-described method for measuring time intervals.

In the prior art, there is also disclosed an apparatus for effecting a method for measuring time intervals (U.S. Pat. No. 3,218,553, Class 324-68), by which the error of the coarse count is eliminated as follows. The timed pulses which occur within the leading and trailing edges of the pulse gating them to the unit counter are discarded. The two components of the total fine count of the discarded portions in the unit count are then analysed and the unit count of each component is separately advanced one count if this component is less, for example, than half the unit of coarse measurement, that is, the period of timed pulses.

A disadvantage of this method for measuring time intervals and of its apparatus lies in that they cannot be used when other methods besides the consecutive count of timed pulses are employed in the coarse measurement of time intervals, and also because considerable technical difficulties arise in their applications, particularly when measuring time intervals in the order of units and tens of nanoseconds.

It is an object of the present invention to avoid the disadvantages encountered in the prior art.

The object of the invention is to provide a method for measuring time intervals and an apparatus for carrying out the method which eliminate the error of coarse measurement encountered in various combinations of prior-art methods for measuring time intervals.

With this object in view, the present invention resides in that in a method for measuring time intervals by which a time interval is coarsely or roughly measured by comparing it with a reference scale formed by a series of precisely timed pulses and its portions occurring between the pulses bounding the measured time interval and the timed pulses are measured finely, after which the coarse count is altered according to the fine count. According to the invention the portions of the time interval contained between the pulses bounding it and those timed pulses, the time interval between which is a multiple of the number of clock pulses, at least equal the number of possible various coarse counts of the same time interval, while in a method for measuring time intervals by which a time interval is coarsely measured by comparing it with a reference scale formed by a series of precisely timed pulses and its portions contained between the pulses bounding the measured interval and the clock pulses are measured finely, after which the coarse count is altered according to the fine count. Further according to the invention the fine count is altered by a number of coarse count units corresponding to the change of the time interval between the timed pulses to which the carry over of the previous measurement is finely measured, so as to complete it to a multiple of the number of timed pulses which are at least equal to the number of possible different coarse counts of the same time interval, whereupon this altered fine count is then taken as that fine count on the basis of which the coarse count is altered.

The invention also resides in that an apparatus for effecting the method disclosed herein, comprises a circuit converting the measured time interval into pulses, one output of which is connected to the input of a coarse-count readout means and the other output of which is connected to a time-count readout means which comprises, according to the invention, a coarse-count correcting means the inputs of which are connected to the outputs of the coarse and fine count readout means, respectively, and the output is connected to the coarse-count readout means.

It is preferable that in an apparatus for effecting the method disclosed herein the coarse-count correcting means should have an additional input which is connected to the output of the time converter, and further comprise at least as many coincidence gates as there may be possible different coarse counts of the same time interval; some of their inputs being connected to the respective outputs of the coarse-count readout means, other inputs to the respective outputs of fine-count readout means, still other inputs to the output of the time converter, and their outputs being connected to the input of the coarse-count readout means. In a second embodiment for effecting the method disclosed herein, the apparatus may comprise at least one fine count correcting means whose input is connected to the output of the time-converter and whose output is connected to the input of the fine-count readout means.

The other input of the fine count correcting means may be connected to the output of fine-count readout means.

The fine-count correcting means may comprise at least one memory circuit whose input is connected to the output of the time converter and whose output is connected to the input of the fine-count readout means via a comparison circuit.

In this case, the memory circuit contains a memory element and at least as many coincidence circuits as there may be different coarse counts of the same time interval less one; some inputs of the coincidence circuits being connected to one output of the converter, other inputs being connected to the respective other outputs of the converter, and the outputs being connected via the memory element to the input of the comparison circuit, while the comparison circuit may have an additional input connected to the output of the converter and its output may additionally be connected to the input of one of the memory elements.

Additionally, the comparison circuit may contain at least as many coincidence circuits as there may be different coarse counts of the same time interval less one, first and second inputs of which are connected to the respective outputs of the memory elements, third inputs are connected to the output of the converter, and the outputs are connected to the inputs of the fine-count readout means and one of the memory elements.

The fine-count correcting means may comprise a binary for measuring the timed pulses until the end of fine measurement, and at least as many coincidence circuits as there may be different coarse counts of the same time interval, some inputs of which are connected to the respective outputs of the fine-count readout means, other inputs of which are connected to the output of the converter, and third inputs to the respective outputs of said binary whose input is connected to the output of the converter and the outputs of all the coincidence circuits to the input of the fine-count readout means and the input of the binary.

The invention will be more fully understood from the following description of preferred embodiments when read in connection with the accompanying drawings, wherein.

Figure 1:
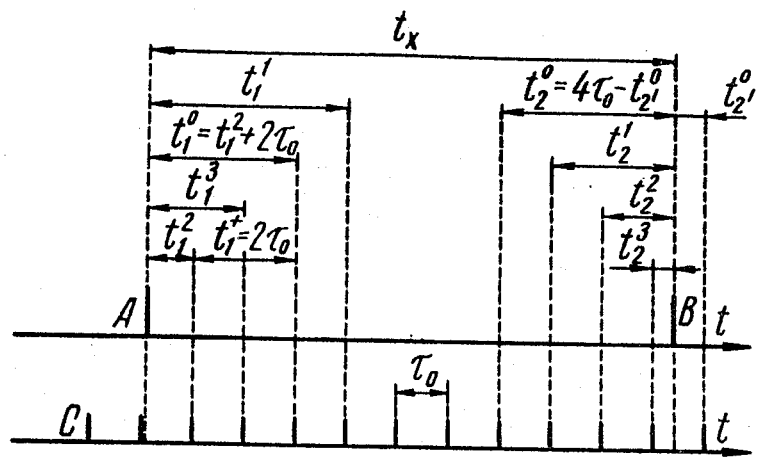
FIG. 1 is a time plot illustrating a method for measuring time intervals according to the invention.

The sequence of operations of the method for measuring time intervals disclosed herein is as follows.

The total count of a time interval $t_x$ (FIG. 1) can be obtained by calculating coarse and fine units in the respective orders of the coarse and fine counts, using arbitrary scale factors K. Let the same time interval $t_x$ be measured twice, at first coarsely and then finely. In order to evaluate the accuracy of the first by reference to the second, it will obviously suffice to compare the lowest-order digit of the coarse count, indicating all the ambiguous readings, with the corresponding digit in the fine count.

For this purpose, a sequence of a series of precisely timed pulses C is generated with a period $\tau_0$ equal to the unit of coarse measurement which may generally be arbitrarily selected.

Subsequently the number of possible different coarse counts of the same time interval and the number of possible counts exceeding a true value are determined. For example, when use is made of the consecutive count of timed pulses for coarse measurement, the duration of radix timed pulses is selected whereby upon being received at the coarse-count readout means 1 (FIG. 6) via a gate 2 they will be registered also when the start pulse A and the stop pulse B, respectively, arrive after or before the timed pulses. In this case, three different coarse counts may occur, and there may be two coarse counts exceeding a true count. When either of the start pulse or the stop pulse coincides with a timed pulse, these numbers will be reduced by unity.

Next, the coarse count, not exceeding a true one, is obtained. In order to do this, the total number is reduced by the number of units of coarse measurement equal to the number of possible coarse counts of the same interval exceeding a true one.

The total fine count is then found of the portions of the time interval $t_x$, contained between the pulses bounding the latter, and between those timed pulses of which the time interval is a multiple of a number N of timed pulses which are at least equal to the number of possible different coarse counts of the same time interval. With N = 4 (FIG. 1), this condition is satisfied by measuring parts $t_1'$ and $t_2'$ or $t_1^2$ and $t_2^2$, or $t_1^3$ and $t_2^3$, or $t_1^0$ and $t_2^0$ of the interval $t_x$. In the general case, the digit of the total fine count corresponding to the lowest-order digit of the coarse count with a scale factor K, which is selected to be equal to N, is obtained by measuring parts $t_1^n$ and $t_2^n$, where $n = 0, 1, 2, 3 ...$ of the interval $t_x$. This is the true value of the lowest-order digit in the coarse count. Therefore, a series of auxiliary pulses with a period $N\tau_0$ is obtained and utilized, in conjunction with the start and stop pulses, as those bounding the intervals $t_1^n$ and $t_2^n$.

It is reiterated that in coarse measurement by the consecutive count of timed pulses a unit of coarse measurement is subtracted from the coarse count. That method of obtaining a fine count is designated as the first version. According to the second version, one obtains the total fine count of the parts of the time interval contained between the pulses bounding the measured interval and certain timed pulses, say, the pulse immediately following the start pulse, and the pulse immediately preceding the stop pulse;

one determines the amount by which the found count of the time interval between the said timed pulses differs from the number which is a multiple of the number of timed pulses equal to at least the number of possible different coarse counts;

the total fine count is altered by as many units of coarse count as will correspond to the change of the time interval between the said timed pulses, so as to raise it to a number which is a multiple of the number of timed pulses equal at least to the number of possible different coarse counts.

The coarse count is altered according to the fine count, that is, the lowest order digit of the coarse count is made equal to the respective highest-order digit of the fine count by adding units of coarse measurement to the coarse count.

FIG. 1 shows a case when three coarse counts may be obtained: a true count; a count which is greater by one unit of coarse measurement; and a count which is greater by two units of coarse measurement. In this case, the scale factors K used in the lowest-order digit of the coarse count and in the respective order of the fine count are equal to four. The highest-order digit of the total fine count corresponding to the lowest-order digit of the coarse count is two. The lowest-order digit of the coarse count, after the subtraction of two units of coarse measurement which may constitute a positive error in the coarse count, is one. Therefore, the lowest-order digit of the coarse count and, as a consequence, the total coarse count should be advanced by one count.

At present, for greater accuracy in measuring time intervals, two methods are most widely used, namely the conversion of the time interval into an amplitude, and the vernier method. It is worth while examining the application of the method for measuring time intervals disclosed herein, applying it to cases where coarse measurement uses other methods than the consecutive count of timed pulses while fine measurement uses the conversion of the time interval into an amplitude, and also when coarse measurement uses the consecutive count of timed pulses and fine measurement uses the vernier method.

A device for measuring time intervals (FIG. 2) pursuant to the method disclosed herein comprises a time-to-amplitude converter 3, a coarse-count readout means 4 and a fine-count readout means 5.

The outputs of the converter 3 are connected to the respective inputs of the means 4 and 5. The converter 3 comprises elements which carry out the coarse and fine measurements of, respectively, the time interval $t_x$ (FIG. 1) and of its parts $t_1^n$ and $t_2^n$ according to the first version of obtaining the total fine count, except the means 4 and 5. The means 4 and 5 may be counters, voltmeters, oscilloscopes, and the like. It also contains a coarse-count correcting means 6 whose inputs are connected to the outputs of the means 4 and 5, and whose outputs are connected to the input of the means 4. In the case on hand, the functions of the means 6 are performed by a human operator who also reduces the coarse count by the requisite number of units of coarse measurement.

Coupling of the input of the converter 3 to the input of the coarse count correcting means 6 makes it possible in some cases, for example, when the means 4 and 5 are counters, to automatically alter the coarse count. This coupling controls the instant at which the correction is initiated. In this case, the functions of the correcting means are performed by a computer. The requisite number of units of coarse measurement is subtracted from the coarse count by setting the means 4 to an appropriate initial position.

Figure 3:
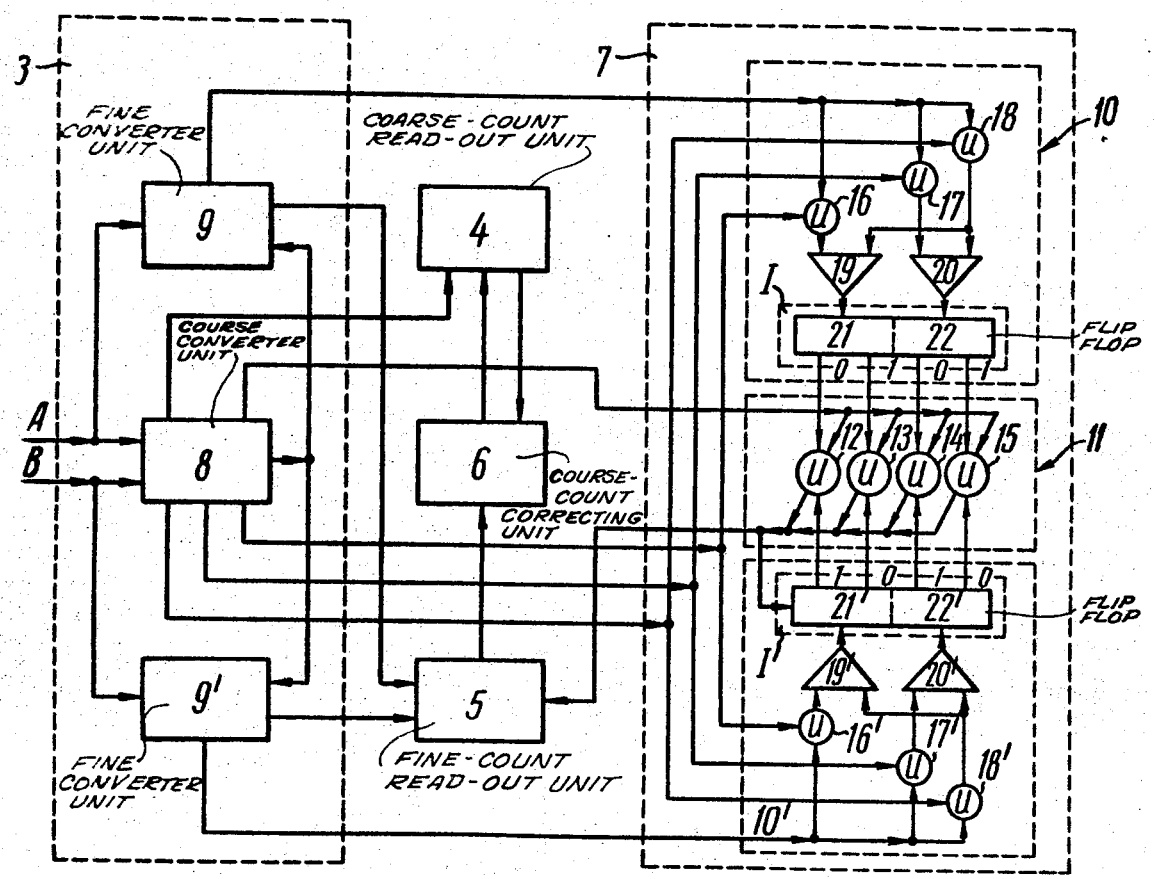
FIGS. 3, 4 and 5 are alternative block-diagrams of an apparatus using the conversion of a time interval to an amplitude for fine measurement, according to the invention.
Figure 4:
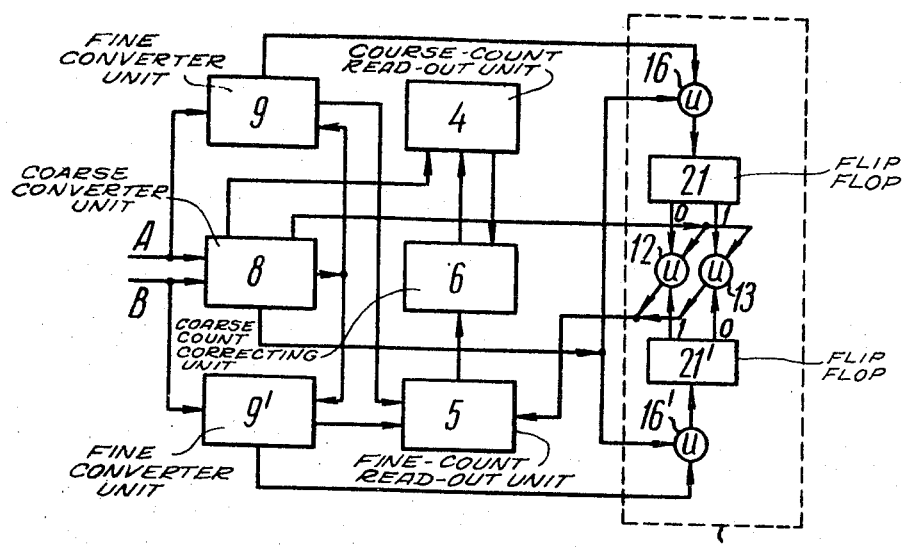
Figure 5:
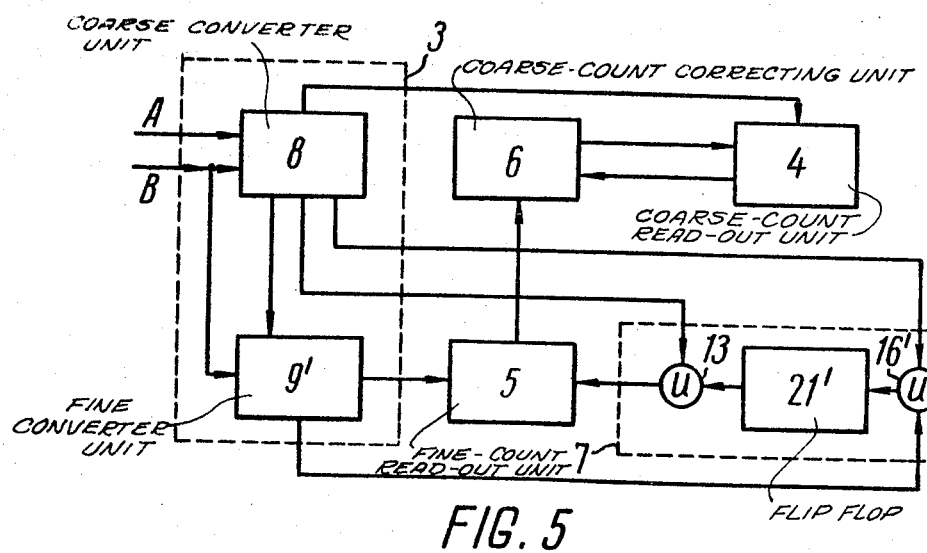

The fact that the apparatus comprises a fine-count correcting means connected with its input to the output of the converter 3 and with its output to the input of the means 5 avoids the difficulties associated with the fine measurement of portions of the time intervals to the timed pulses the time interval between which is a multiple of, at least, the number of possible different coarse counts of the same interval. Coupling of the converter 3 to the fine-count correcting means 7 allows for analysis of the time position of the timed pulses to which the fine measurement is taken of the portions $t_1^n$ and $t_2^n$ of the time interval $t_x$ (FIG. 1), while in the automatic correction of the fine count it controls the instant at which the correction is initiated. At the same time, the converter 3, comprising a coarse converter 8 (FIGS. 3, 4, 5) and fine-converter 9 (9'), in some cases, for example when fine measurement uses the conversion of the time interval into an amplitude, additionally contains elements which analyse the time position of the timed pulses to which fine measurement is made of the portions $t_1^n$ and $t_2^n$ of the time interval $t_x$. In a particular case, it may contain delay lines (not shown) with which the pulses following with a period N times the period of the timed pulses are transformed into N−1 auxiliary trains of pulses delayed by $\tau_0$, $2\tau_0$, ... (N−1) $\tau_0$ relative to one more imaginary series of pulses. The pulses thus obtained may be used in the analysis of the time position of the timed pulses bounding the parts $t_1^n$ and $t_2^n$ of the time interval in memory circuits 10 (10').

In this case, the correcting means 7 comprises either one or two memory circuits 10 (10') whose outputs are connected to the respective inputs of a comparison circuit 11 and the output of the latter is connected to the input of the fine-count readout means 5. The state of the memory elements 1 and 1' is determined, that is, the function of the comparison circuit 11 is performed, by a human operator. The operator also alters the fine count. In the case of automatic adjustment, for example, when the comparison circuit 11 uses coincidence circuits 12, 13, 14 and 15, additional coupling is provided from the output of the converter 3 to the input of the comparison circuit 11.

However, when the vernier method is used for the fine measurement of time intervals, information about the time position of the timed pulse to which the fine measurements is taken of the parts $t_1^n$ and $t_2^n$ of the time interval $t_x$ may be obtained only by an additional analysis of the fine count. Therefore, in this case it is necessary to provide a coupling (not shown) from the output of the fine-count readout means 5 to the input of the fine-count correcting means (not shown).

Figure 2:
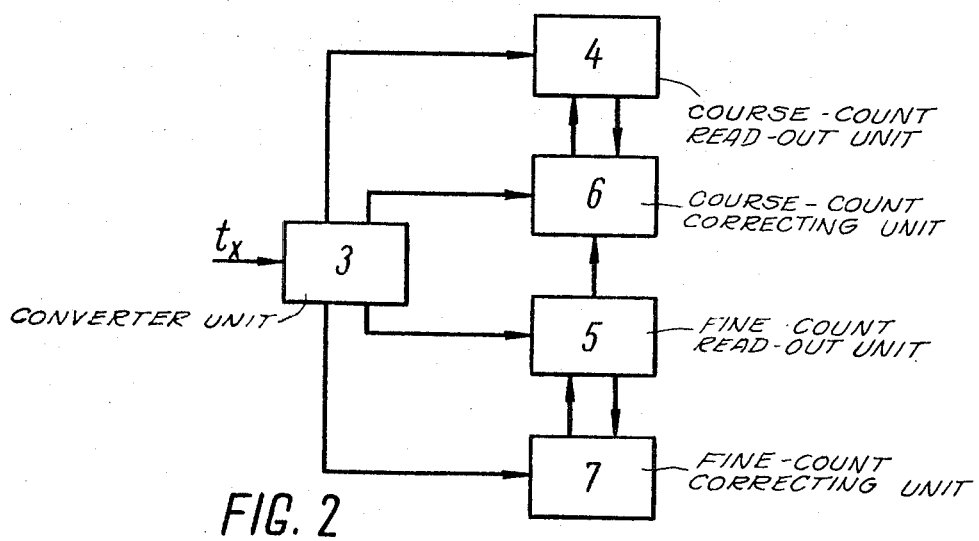
FIG. 2 is a schematic block-diagram of an apparatus for measuring time intervals according to the invention.

Summing up, the schematic block-diagram of FIG. 2 illustrates two embodiments of an apparatus for effecting the method for measuring time intervals disclosed herein, namely one method without and the other with coupling between the output of the fine-count readout means 5 and the input of the fine-count correcting means. The first embodiment offers a good illustration of an apparatus which utilizes the time-to-amplitude conversion method and the second, the vernier method for fine measurement.

Suppose that the number of possible coarse counts of one and the same interval exceeding a true count is unity.

An apparatus for measuring time intervals, using the time-to-amplitude conversion method for fine measurement and any method (for example, the vernier method) for coarse measurement with not more than four possible different coarse counts, comprises a coarse-count readout means 4 (FIG. 3) and a fine-count readout means 5, and also a coarse-count correcting means 6 the inputs of which are connected to the outputs of the said readout means and the output of which is connected to the input of the means 4. The functions of the coarse-count correcting means 6 are performed by a human operator, but, as an alternative, this may be done by an automatic device which makes the lowest-order digit of the coarse count equal to the highest-order digit of the fine count.

The time-to-amplitude converter 3 comprises a coarse converter 8 and fine-converters 9 9', which transform respectively the time interval $t_x$ (FIG. 1) and its portions $t_1^2$ and $t_2^2$ either to a number of pulses or to a voltage, etc. The inputs of the coarse converter 8 are connected to the respective inputs of the fine converters 9 and 9', one output to the inputs of the converters 9 and 9' and the other output to the input of the readout means 4. The fine-count correcting means 7 comprises memory circuits 10 and 10' and a comparison circuit 11. The comparison circuit 11 comprises coincidence circuits 12, 13, 14 and 15 some inputs of which are connected to the output of the coarse converter 8 and the outputs to the input of the readout means 5. Other inputs of the readout means 5 are connected to the respective outputs of the fine converters 9 and 9'. The memory circuits 10 and 10' comprise coincidence circuits 16, 17, 16', 17' and 18', OR gates 19, 20 and 19' and 20', and memory elements 1 and 1' using, for example series-connected flip-flops 21,22, and 21', 22'. Other inputs of the coincidence circuits 12, 13, 14, and 15 are connected between the respective "1" and "0" outputs of the flip-flops 21, 22 and 21', 22', while the input of the flip-flop 21 is connected to the said outputs of these coincidence circuits. The outputs of the coincidence circuits 16 and 17, 17 and 18, 16' and 18', 17' and 18' are respectively connected via the OR gates 19, 20 and 19', 20' to the inputs of the memory elements 1 and 1' using the flip-flops 21, 22, 21', 22'. Some inputs of the coincidence circuits 16, 17, 18 and 16', 17', 18' are respectively connected to the outputs of the converters 9 and 9'. Other inputs of the coincidence circuits 16, 16'; 17, 17'; 18, 18' are connected to the respective outputs of the coarse converter 8.

The time-interval measuring device using the time-to-amplitude conversion method for fine measurement with not more than two possible different coarse counts of the same interval (FIG. 4) differs from the previous embodiment in that it has no coincidence circuits 17, 18, 18', 17', 14, 15, OR gates 19, 20, 19', 20', or the flip-flops 22, 22'. Besides, there is no need for coupling the outputs of the coincidence circuits 12, 13 to the input of the flip-flop 21' because in this case one auxiliary pulse is sufficient to correct the fine count. When the start pulse A coincides with one of the timed pulses representing the 0 state of the flip-flop 21', the apparatus (FIG. 5) will have no fine converter or the coincidence circuit 21.

In the time-interval measuring device using the vernier method for fine measurement and the consecutive count of timed pulses for coarse measurement, with the start pulse coincident with a timed pulse and with not more than two possible different coarse counts of one and the time interval, the coarse and fine count readout means 4 and 5 respectively a unit counter 1 (FIG. 6) and a fraction counter 23, based on flip-flops. The coarse-count correcting means 6 is coincidence circuits 24 and 25 placed between the 0 and 1 outputs of the flip-flop of the highest-order digit of the fraction counter 23 and the flip-flop of the lowest-order digit of the unit counter 1. The outputs of the coincidence circuits 24 and 25 are connected to the lowest-order flip-flop of the unit counter 1. The fine-count correcting means 7 is a binary 26 counting the timed pulses to the end of fine measurement, made in the form of, say, a flip-flop, and coincidence circuits 27, 28. The coincidence circuits 27, 28 are placed between the 0 and 1 outputs of the flip-flop in the binary 26 and the lowest-order flip-flop of the fraction counter 23. Their outputs are connected to the highest-order flip-flop of the fraction counter 23. The converter 3 is a combination of a coarse oscillator 29, a vernier oscillator 30, a coincidence circuit 31, a gate 2, a delay line 32, and a subtraction circuit 33 (not illustrated in the drawing) which, in a special case, is a series combination of a single-input flip-flop, a separate input flip-flop having only one of its inputs connected to the previous flip-flop, and a coincidence circuit the other input of which is connected to the input of the single-input flip-flop. One input of the coincidence circuit 31 is connected to the output of the oscillator 29 and to the inputs of the gate 2 and of the binary 26, and the other input to the output of the oscillator 30 and the input of the fraction counter 23, and the output to the inputs of the oscillators 29 and 30 and the delay line 32. One output of the delay line 32 is connected to the inputs of the coincidence circuits 24 and 25 and the other to the inputs of the coincidence circuits 27 and 28. The input of the gate 2 is connected to the input of the vernier oscillator 30 and the output to the input of the counter 1 via the subtraction circuit 33.

Considering now operation of the apparatus using the conversion of the time interval into an amplitude for fine measurement.

Initially, the flip-flops 21, 22, and 21', 22' (FIG. 3) are set to zero, and the coarse-count readout means 4 and the fine-count readout means 5 also read zero. The inputs of the coincidence circuits 16, 16'; 17, 17'; and 18, 18' accept from the coarse converter 8 trains of pulses produced from a series of timed pulses with a period $\tau_o$. The time position of the pulses in these trains is determined relative to the pulse of one more (fourth)imaginary train. The pulses in the first train delayed by $\tau_o$ relative to the fourth train are applied to the coincidence circuits 16, 16'; the pulses of the second train delayed by 2 $\tau_o$ to the gates 17, 17'; and the pulses of the third train delayed by 3 $\tau_o$ to the gates 18, 18'.

Receipt of the start pulse A by the coarse converter 8 (FIG. 3) and the fine converter 9 initiates the coarse measurement of the time interval $t_x$ and of its portion $t_1^2$ ...

Information about the time pulse to which the interval $t_1^2$ is measured comes in the form of an auxiliary pulse from the fine converter 9 to the inputs of the coincidence circuits 16, 17, 18. The coincidence circuits 16, 17, 18 determine the time position of the timed pulse to which the portion $t_1^2$ of the time interval $t_x$ is measured, and the flip-flops 21 and 22 memorize it. The OR gates 19 and 20 serve to decouple (separate) the inputs of the flip-flops 21 and 22.

Receipt of the stop pulse by the coarse converter 8 and the fine converter 9 terminates the coarse measurement and initiates the measurement of the interval $t_2^{**o}$. Information about the timed pulse to which the interval $t_2^o$, is measured comes in the form of an auxiliary pulse from the fine converter 9' to the inputs of the coincidence circuits 16', 17', and 18'. The coincidence circuits 16', 17', and 18' determine the time position of the timed pulse to which the interval $t_2^o$, is measured, and the flip-flops 21' and 22' memorize it. The OR gates 19' and 20' disconnect the inputs of the flip-flops 21' and 22'.

As auxiliary pulses are applied from the coarse converter 8 to the coincidence circuits 12, 13, 14, and 15, the fine count readout means 5 gives an indication $t_1^o = t_1^2 + 2\tau_o$, after which it gives an indication $t_2^o = 4\tau o - t_2'$. The total readout of the means 5 is $2\tau_o + t_1^2 - t_1^o$.

After completing the above-described operations, the operator 6 alters the coarse count according to the fine count. For this purpose the operator finds the remainder left after dividing the coarse count less the likely positive error ($\tau o$) by $4\tau_o$ in units of coarse measurement $\tau_o$. The remainder thus found is compared with the highest-order digit of the fine-count readout means 5. The number of possible readings in the latter is chosen to be equal to the number of possible values of the remainder. The highest-order digit of the fine-count readout means 5 is a true one. The remainder is either true and is the same as the highest-order digit of the fine-count readout means 5, or it is false and is smaller. Adding units of coarse measurement to the coarse count until the two values are made equal ensures the adjustment of the coarse count according to the fine count.

Simplified versions of the apparatus (FIGS. 4 and 5) operate in a similar manner, except that a single auxiliary pulse is applied to the inputs of their coincidence circuits 12 and 13 from the coarse converter 8. When the start pulse A (FIG. 5) coincides with the zero timed pulse, this pulse may pass to the fine-count readout means 5 only when the single timed pulse coincides with the timed pulse to which the fine measurement has been made.

Considering now operation of a time-interval measuring device using the vernier method for fine measurement and the consecutive count of clock pulses for coarse measurement.

Originally, the unit counter 1 (FIG. 6) and the fraction counter 23 and also the binary 26 are set to zero, and the gate 2 is open.

Figure 7:
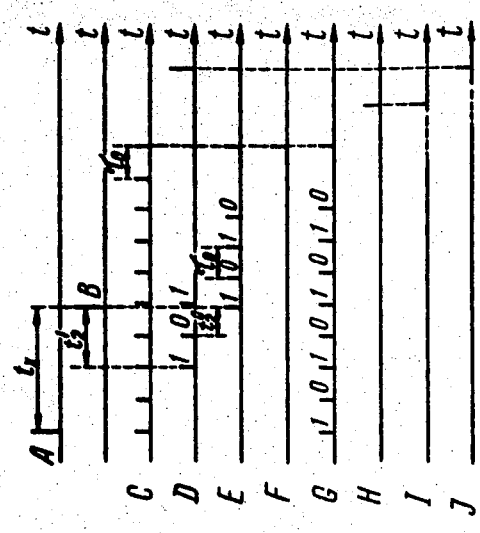
FIG. 7 is a time plot illustrating operation of the apparatus of FIG. 6.

The start pulse A (FIG. 7) shock-excites the coarse oscillator 29 into oscillation with a period $\tau o$. The timed pulses C go to the unit counter 1 via the gate 2 and the subtraction circuit 33, the binary 26, and the coincidence circuit 31.

The stop pulse B closes the gate 2, thereby blocking the passage to the counter 1 for timed pulses and shock-excites the vernier oscillator 30 into oscillation with a period $\tau_o' = 0.99 \tau o$. The vernier pulses E go to the fraction counter 23 and the coincidence circuit 31.

The pulse F generated by the coincidence circuit 31 when the timed pulse and the vernier pulse coincide goes from the output of the coincidence circuit 31 to the inputs of the oscillators 29 and 30 and to the delay line 32. As a result, coarse and vernier pulses are no longer generated and applied to the binary 26 and the counter 23. This terminates the fine measurement.

After some delay required for the flip-flops of the binary 26 and of the lowest-order digit of the fraction counter 23 to change state, the coincidence pulse goes to the coincidence circuits 27 and 28 and further, after some delay required for the highest-order flip-flop of the fraction counter 23 to change state, to the coincidence circuits 24 and 25. The former operation ensures the adjustment of the fine count. When the state of the first flip-flop in the fraction counter 23 is the same as that of the binary 26, the pulse H does not pass through the coincidence circuits 27 and 28 to the counter 23, while it does when the two are in the same state. The coarse count is altered according to the fine count in a similar manner. For better insight into the operations of the apparatus on the pulses registered by the binary 26 and the lowest-order flip-flops of the unit counter 1 and of the fraction counter 23 and shown in the time plot of FIG. 7, the states (0 and 1) of these flip-flops are respectively marked by the letters C, D and E. Obviously, when the binary 26 and the lowest-order flip-flop of the fraction counter 23 are in the same state, the fine measurement has been made to the timed pulse required by the method disclosed herein.

Figure 6:
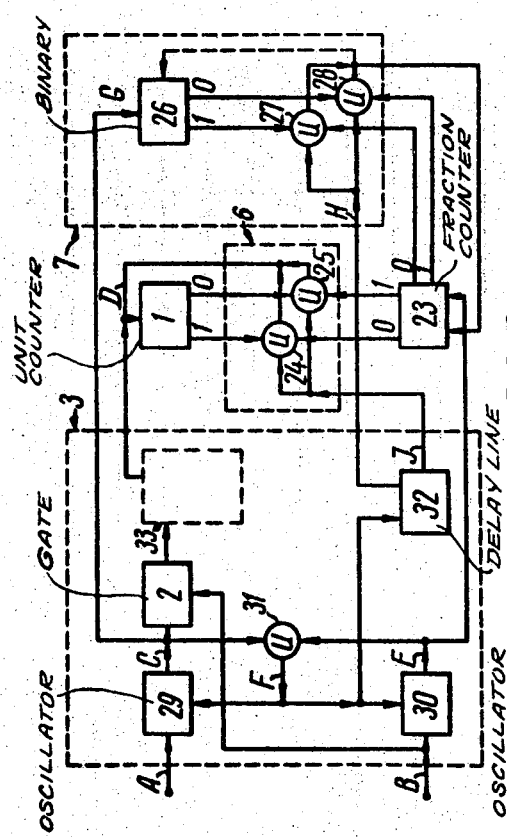
FIG. 6 is a block-diagram of an apparatus using the vernier method for fine measurement of time intervals and the consecutive count of timed pulses for coarse measurement, according to the invention.

In constructing the apparatus described herein with a greater number of possible different coarse counts of the same time interval, there should be a proportionate increase in the number of coincidence circuits, the flip-flops of the counters and binaries performing the adjustment of the coarse and fine counts, with the same connections between them as already described. It is also necessary to connect the outputs of the coincidence circuits connected between the fraction counter and the binary to the input of the binary so as to provide for the change of state of the binary. Otherwise any number of auxiliary pulses would pass through the connected coincidence circuits to the fraction counter. In FIG. 6, this connection is shown by the dotted line.

In cases where it is necessary to use the vernier method for measuring the portions $t_1^2$ and $t_2^3$ of a time interval $t_x$ (FIG. 1) and to present the result as a single line, the following two approaches to the adjustment of the fine count can be used in the apparatus:

to fix the time position of the two coincidence pulses by placing gates closed by the coincidence pulses between the free-running coarse oscillator and two binary; to adjust subsequently the two fine counts of, for example, portions $t_1^2$ and $t_2^o$, of the interval $t_x$, and to transfer the adjusted count of the interval $t_2^o$, to the counter which has registered the adjusted count of the interval $t_1^2$;

to fix the relative time position of the coincidence pulses by placing a scale-of-two gate turned on by one and off by the other coincidence pulse between the said oscillator and one binary; to set to zero the binary in the case of their coincidence; to adjust subsequently the count of the interval $t_1^2$ and to transfer the count of the interval $t_2^o$, to the counter which has registered the adjusted count of the interval $t_1^2$.

In each approach, it will suffice to double the number of elements performing the adjustment and shown in FIG. 6. It is possible to omit the subtraction circuit and use a unit counter for the purpose.

It should be noted that the apparatus disclosed herein does not call for an increased speed of response on the part of its component units.

A major advantage of the invention is that it can be used in conjunction with any known methods for coarse and fine measurement of time intervals. This is why it has been possible to combine the vernier method and the time-to-amplitude conversion method of measuring time intervals. This, in turn, enables time intervals to be measured with high accuracy over a wide range of values with a time resolution of a few hundredths of a nanosecond. The range of the device can be extended, for example, by combining the consecutive count of clock pulses and the vernier method, or the vernier method and the time-to-amplitude conversion method. The time-interval measuring device utilizing this combination of methods is considerably superior in performance to all existing instruments used for the purpose. It should also be noted that the method for measuring time intervals disclosed herein may serve as a basis for combined measurement of many physical and electrical quantities, such as frequency, velocity, voltage, and so on, without reducing them to a time interval.

What is claimed is:

1. A method for measuring time intervals by which: a reference scale is formed with a series of precisely timed pulses; the time interval of interest is measured coarsely by comparing it with said reference scale; fine measurement is made of the parts of the time interval contained between the pulses bounding this interval and those timed pulses the time interval between which is a multiple of the number of timed pulses which is at least equal to the number of possible different coarse counts of the same interval; the coarse count is altered according to the fine count.

2. A method for measuring time intervals by which: a reference scale is formed with a series of precisely timed pulses; the time interval of interest is measured coarsely by comparing it with said reference scale; fine measurement is made of the parts of said interval contained between the pulses bounding this interval and timed pulses; the fine count is changed by as many units of coarse measurement as will correspond to the change of the time interval between said timed pulses to which said fine measurement is made of the remainder left after the previous measurement, as it is completed to a multiple of the number of timed pulses at least equal to the number of possible different coarse counts of the same interval, and this adjusted fine count is taken as the fine count that is used subsequently for the adjustment of said coarse count.

3. A device for measuring time intervals, comprising a time converter whose input accepts timed pulses whose number corresponds to the measured time interval, a coarse-count readout means whose input is connected to the input of said time converter; a coarse-count correcting means one input and the output of which are connected to said coarse-count readout means; a fine-count readout means whose input is connected to the output of said time converter and its output to said coarse-count correcting means.

4. A device, as in claim 3, in which said coarse-count correcting means has an additional input corrected to the output of said time converter;

5. A device, as in claim 4, in which the coarse-count correcting means comprises: at least as many coincidence circuits as there may be possible different coarse counts of the same time interval, some inputs of these coincidence circuits being connected to the respective outputs of said coarse-count readout means, other inputs being connected to the respective outputs of said fine-count readout means, third inputs to the output of said time converter, and their outputs to the input of said coarse-count readout means;

6. A device to realize the method of claim 2, comprising a time converter whose input accepts timed pulses whose number corresponds to the time interval being measured; a coarse-count readout means whose input is connected to the output of said time converter; a coarse-count correcting means one input and the output of which are connected to said coarse-count readout means; a fine-count readout means whose input is connected to the output of said time converter and whose output to said coarse-count correcting means; a fine-count correcting means whose input is connected to the output of said time converter and whose output to the input of said fine-count readout means.

7. A device as in claim 6, in which said fine-count correcting means is connected to the output of said fine-count readout means.

8. A device as in claim 6, in which said fine-count correcting means comprises at least one memory circuit and a comparison circuit, the input of said memory circuit being connected to the output of said time converter and its output being connected via said comparison circuit to the input of said fine-count readout means.

9. A device, as in claim 8, in which said memory circuit comprises: a memory element and at least as many coincidence circuits as there may be possible different course counts of the same interval less one, some inputs of said coincidence circuits being connected to one output of said time converter, other inputs to the respective other outputs of said time converter, and the outputs to the input of said comparison circuit via said memory element.

10. A device, as in claim 9, in which said comparison circuit has an additional input connected to the output of said time converter while its output is additionally connected to the output of one of said memory elements.

11. A device, as in claim 10, in which said comparison circuit comprises: as many of the other coincidence circuits as there may be possible different coarse counts of the same interval less one, the first and second inputs of which are connected to the respective outputs of said memory elements, the third inputs to the output of said time converter, and the outputs to the inputs of said fine-count readout means and one of said memory elements.

12. A device, as in claim 7, in which said fine-count correcting means comprises: as many of other coincidence circuits as there may be possible different coarse counts of the same time interval, some of their inputs being connected to the respective outputs of said fine-count readout means, other inputs to the output of said time converter, third inputs to the respective outputs of said binary whose input is connected to the output of said time converter, and the outputs of all said coincidence circuits are connected to the input of said fine-count readout means and the input of said binary.

* * * * *